United States Patent [19]

Barnes et al.

[11] Patent Number: 4,821,760

[45] Date of Patent: Apr. 18, 1989

[54] VOICE COIL ASSEMBLY FOR AN ELECTROPNEUMATIC CONVERTER

[75] Inventors: Christine B. Barnes, Wickliffe; Thomas E. Martin, Chesterland; Frank E. Nardis, Painesville, all of Ohio

[73] Assignee: The Babcock & Wilcox Company, New Orleans, La.

[21] Appl. No.: 655,409

[22] Filed: Sep. 28, 1984

[51] Int. Cl.[4] .................... G05D 16/00

[52] U.S. Cl. .................... 137/82; 137/84

[58] Field of Search .................... 318/481, 645; 137/82, 137/84, 85

[56] References Cited

U.S. PATENT DOCUMENTS

| | | | |
|---|---|---|---|
| 3,173,437 | 3/1965 | Adams | 137/82 |
| 3,250,293 | 5/1966 | Adams et al. | 251/129.08 X |
| 3,455,318 | 7/1909 | Jenney | 137/85 |
| 3,521,854 | 7/1970 | Leiber | 251/129.02 |
| 3,598,138 | 8/1971 | Hadley | 137/82 |
| 3,799,498 | 3/1974 | Wickham | 251/129.08 |

*Primary Examiner*—Alan Cohan

*Attorney, Agent, or Firm*—Vytas R. Matas; Robert J. Edwards; Daniel S. Kalka

[57] ABSTRACT

An electropneumatic converter is provided with a voice coil having a vane directly connected to the coil. The vane and coil assembly is attached to a spring and resiliently supported by the spring for movement relative a nozzle outlet in response to dc input signals applied to the coil.

4 Claims, 2 Drawing Sheets

VOICE COIL ASSEMBLY FOR AN ELECTROPNEUMATIC CONVERTER

TECHNICAL FIELD

This invention relates to electropneumatic converters of the type utilized with electric controllers for converting an electric output signal from a controller to air signals for operating pneumatic actuators or positioners.

BACKGROUND ART

Electropneumatic converters are widely used in connection with process control in various applications, for example, where an electric signal is to be utilized to control a pneumatic device such as a positioner, a diaphragm-actuated valves and/or an actuator. The electropneumatic converter is usually located in a control loop between a controller and a positioner or actuator and may be embodied as an assembly in an operated component.

In typical electropneumatic converters, a current signal is applied to a torque motor or a force-coil motor. A flapper, also referred to as a cam or vane, is mechanically coupled to the armature of the torque motor or is attached to the coil in a force-coil motor system. The flapper is located in proximity to the air outlet of a nozzle, known as a baffle-nozzle or flapper nozzle, which is continually pressurized by a source of compressed air. The nozzle normally exhausts to atmosphere. The flapper is moved to the outlet of the nozzle to restrict air flowing through the nozzle and, accordingly, vary the back pressure in the air supply line which feeds the nozzle. The air supply is typically connected to a bellows assembly which moves in response to the back pressure and creates a signal pressure generally in the range of 3 to 15 psig (20.7 to 103 kPa). The output signal pressure is utilized to position or actuate a controlled device.

Known types of force-coil electropneumatic converters utilize various kinds of linkages or counterbalances to operatively connect the coil and vane. Multiple linkages and counter-balances, however, can detrimentally affect both the reliability and accuracy of such converters.

SUMMARY OF THE INVENTION

It is a general object of the invention to provide an electropneumatic converter having increased reliability as well as providing fast, sensitive and accurate conversion of electric analog signals to pneumatic signals to power positioning or actuating devices.

In accordance with the invention, a coil and vane assembly is suspended by a spring in a magnetic field of an electromagnet in proximity to the outlet of a nozzle connected to a source of air under pressure. The spring is connected to the coil and vane assembly and to a fixed support that is mounted to the housing. As current is increased to the coil, the coil and vane move out of the magnetic field. The vane, which is directly attached to the coil without any intervening linkage or counter-balance, blocks the outlet of the nozzle to vary the outflow of air and create a backpressure that acts against a diaphragm and cause movement of the diaphragm. The motion of the diaphragm displaces a valve and allows a pneumatic signal pressure to be transmitted to a controlled device. The spring design of the coil and vane support allows for extremely accurate, linear response since the small mass of the coil and because the vane is directly attached to the coil without linkages or counter-balances. The absence of friction between parts causes repeatability and hysteresis error to be less than 0.3%. The use of fewer moving parts improves reliability.

BRIEF DESCRIPTION OF THE DRAWING

In the accompanying drawings, forming a part of this specification, and in which reference numerals shown in the drawings designate like or corresponding parts throughout the same.

DETAILED DESCRIPTION

Figure 1:
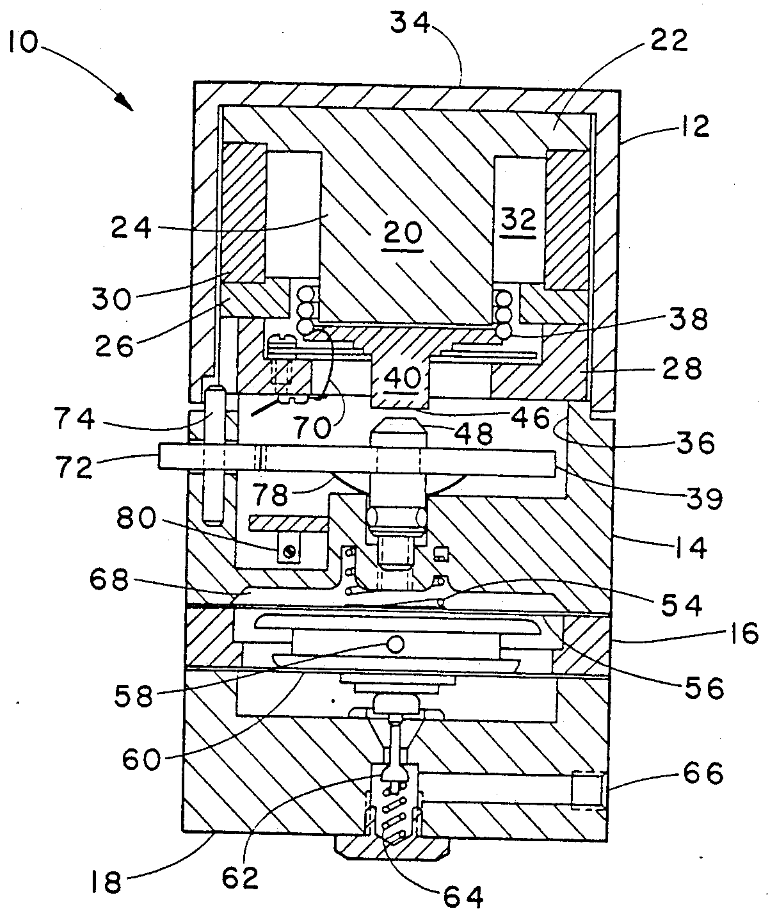
FIG. 1 is a vertical cross-section of a positioner embodying an electropneumatic converter according to the invention.

Referring now to the drawings in detail, FIG. 1 illustrates a cylindrical electropneumatic positioner generally designated 10 with a multiple-section housing including a coil housing 12, a nozzle housing 14, a diaphragm housing 16 and an inlet housing 18.

The coil housing 12 contains an electromagnet comprising a T-shaped pole piece 20, with a horizontal flange 22 and an elongated leg 24, a bottom pole 26 mounted within the coil housing 12 atop an annular coil support member 28 and a ring magnet 30 located intermediate the pole pieces 20, 26 and radially separated by a space 32 from the elongated leg 24 of the T-shaped pole piece 20, which are secured between a top wall 34 of the coil housing 12 and an anular flange 36 of the nozzle housing 14.

Figure 2:
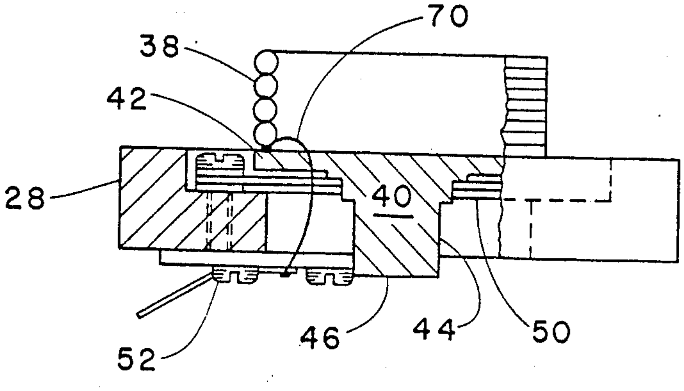
FIG. 2 is an enlarged detail view of the vane and coil assembly, partly in section, of FIG. 1.

A voice coil 38 is disposed in the space 21 between the poles concentrically about a portion of the leg 24, and has a larger diameter than the leg 24 to permit vertical movement of the voice coil 38. A vane 40 is bonded directly to the lower end of the voice coil 38 for vertical movement with the voice coil. In the illustrated embodiment, the vane 40 is composed of a circular disc 42. The periphery of the disc 42 is fixed to the voice coil 38. A boss 44 extends from the center of the disc and terminates in a sealing face 46 located proximate to the outlet of a nozzle 48. As is best shown in FIG. 2, the voice coil 38 and vane 40 are spring mounted, by a flat guide spring 50 to the coil support member 28. The coil support member 28, in turn, is mounted atop the annular flange 36 of the nozzle housing 14. The guide spring 50 is mechanically fixed to the coil support member 20 as by screw connections 52. The guide spring 50 preferably comprises a disc spring having a central aperture through which the boss 44 of vane 40 extends. The guide spring 50 is staked to the boss 44 and engages the vane 40 to resiliently urge the voice coil 38 and vane 40 upwardly.

The nozzle 48 is fixedly mounted within the nozzle housing 14. The outlet of the nozzle 48 is vertically aligned with the sealing face 46 of the vane 40. A spring 54 is located intermediate the nozzle housing 14 and an upper diaphragm 56 of the diaphragm housing 16. An air outlet 58 from the diaphragm housing 16 intermediate the upper diaphragm 56 and a lower diaphragm 60 provides means for supply air to the controlled device.

The inlet housing 18 includes a valve 62 mounted to the inlet housing 18 by an inlet spring 64 in a configured bore of an air inlet passage 66 to provide a communication path for air to the lower face of the lower diaphragm 60.

In operation, pressurized air is continually fed to the nozzle 48 by a air supply connection (not shown) to a chamber 68. As a 4 to 20 mA dc current signal is applied to the voice coil 38 through an electric wiring 70, the voice coil 38 and vane 40 move away from the magnet assembly against the spring force or guide spring 50 toward the outlet of the nozzle 48 so as to increase the back pressure in chamber 68 and eventually block off the nozzle outlet. This increased back pressure acts against the upper diaphragm 56 and forces the diaphragm to move downward. This motion displaces the valve 62 downwardly and allows a high flow of pressurized air, corresponding to the dc input control signal, to be transmitted from the air inlet passage 66 to the air outlet 58 and then to the finally controlled device (not shown).

The magnet assembly preferably comprises a ring magnet 30 with high permeability pole pieces 20, 26. In a preferred arrangement, the ring magnet 30 is made of Alnico V and the pole pieces 20, 26 are composed of a sintered composition of iron with 0.45% phosphorous and 1% carbon, such as is marketed by Hoeganaes Corp. under the trademark ANCORSTEEL 45. The coil housing 12 is preferably aluminium. A 565 turn, 115 copper wire voice coil 38 is preferably suspended by the guide spring 50 to float in the magnetic field. The vane 40 constitutes the end of the voice coil 38 to seal off the nozzle 48 to create a back pressure. The backpressure moves the two diaphragms 56, 60 which act as a 1:1 booster. The motion of the diaphragms causes the valve 62 to open or close a supply of air typically pressurized in the range of 3 to 15 psig (20.7 to 103 kPa).

A mechanical zero adjustment is provided to position the vane 40 relative to the nozzle 48. A gear 72 is rotatably mounted on a pin 74 that is interconnected between the coil housing 12 and nozzle housing 14. The gear 72 is intermeshed with a second gear 76 that is centrally connected to the nozzle 48. The nozzle 48 is threadably connected to the nozzle housing 14. Uponn rotation of the gear 72 about the pin 74, the gear 76 is turned and the threaded nozzle 48 is moved toward or away from the vane 40. The gear 76 is supported by a spring washer 78.

Figure 3:
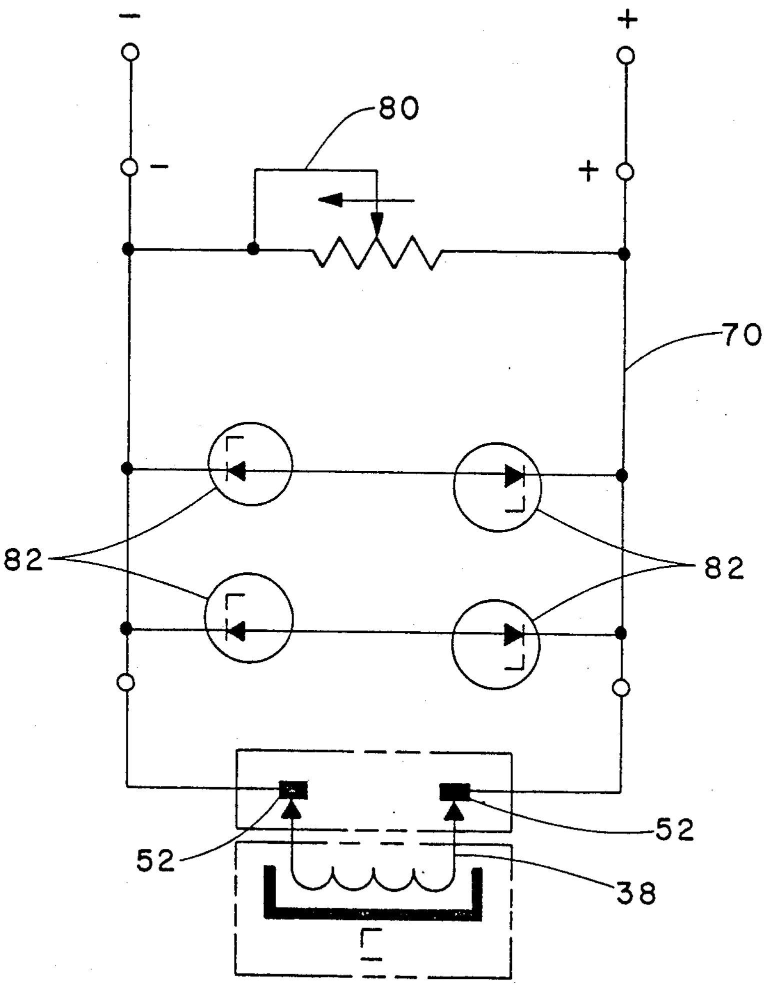
FIG. 3 is an electrical schematic diagram showing an arrangement for obtaining electric range adjustment of the voice coil relative to the magnet assembly.

An electrical range adjustment is provided to vary the degree of movement of the voice coil 38 relative to the magnet assembly. A potentiometer 80 and a resistive network 82 are connected between the electrical wiring 70 and the voice coil 38 as shown in FIG. 3. Upon adjustment of the potentionmeter 80, its resistence value is changed and the value of the electrical current reaching the voice coil 38 is increased or decreased thereby limiting or increasing the range of the vane relative to the nozzle. Zener diodes 82 act as an intrinsic safety barrier by damping out any current stored in the voice coil 38 in the event electrical wiring 70 is broken.

An electropneumatic converter constructed in accordance with the invention provides fast, sensitive and accurate positioning of pneumatic single or double-acting actuators of either linear or rotary motion. Positoners embodying the converter can be adjusted to fail to a full open or full closed position upon loss of the current input signal. The positioner will usually be located in a control loop between a controller and the final control element actuators, typically a cylinder or diaphragm. When a dc milliamp input is applied to the voice coil, the positioner acts as a pneumatic relay, through an independent air supply, and directs the piston or valve to a new position. A mechanical connection can be effected between the final control element to a position feedback to establish the actual position.

The embodiments of the invention in which an exclusive property or privilege is claimed are defined as follows:

1. In an electropneumatic converter, the combination comprising a nozzle connected to a source of air under pressure, an electromagnet including a coil and a vane directly connected to the coil in proximity to the outlet of the nozzle, a fixed support member, a spring means conencted to the fixed support for resiliently supporting the vane and coil, means for energizing the electromagnet to move the coil and vane toward the outlet of the nozzle to vary the outflow of air under pressure from the outlet of the nozzle, and electrical means for adjusting the current of said electromagnet to adjust the range of the converter.

2. An electropneumatic converter as set forth in claim 1 further comprising mechanical means for adjusting the position of the nozzle relative to the vane to provide for a zero adjustment thereby.

3. An electropneumatic converter as set forth in claim 1 wherein the vane comprises a circular disc attached to the coil along its periphery and includes a boss projecting from the center of the disc having a sealing face proximate the outlet of the nozzle.

4. An electropneumatic converter as set forth in claim 4 wherein the spring means comprises a disc spring surrounding the boss.

* * * * *